United States Patent [19]

Junkermann et al.

[11] 4,104,162
[45] Aug. 1, 1978

[54] PROCESS FOR DETOXIFICATION OF FORMALDEHYDE CONTAINING WASTE WATERS

[75] Inventors: Helmut Junkermann; Heinrich Schwab, both of Frankfurt, Germany

[73] Assignee: Deutsche Gold- und Silber-Scheideanstalt vormals Koessler, Frankfurt, Germany

[21] Appl. No.: 601,957

[22] Filed: Aug. 4, 1975

Related U.S. Application Data

[63] Continuation-in-part of Ser. No. 569,747, Apr. 21, 1975, abandoned.

[30] Foreign Application Priority Data

Apr. 22, 1974 [FR] France .................................. 74 13931
Sep. 26, 1974 [FR] France .................................. 74 32527

[51] Int. Cl.² .......................... C02B 1/34; C02C 5/04
[52] U.S. Cl. ................................................. 210/63 R
[58] Field of Search ............................. 210/50, 59, 63

[56] References Cited

U.S. PATENT DOCUMENTS 3,829,379  8/1974  Ishida et al. .......................... 210/59

OTHER PUBLICATIONS

Walker, "Formaldehyde," Third Edition, Reinhold Publishing Corp., New York, 1964, pp. 244–247.

*Primary Examiner*—Thomas G. Wyse
*Attorney, Agent, or Firm*—Cushman, Darby & Cushman

[57] ABSTRACT

Formaldehyde containing waste water is detoxified by treating the waste water with hydrogen peroxide in the presence of alkali at an initial temperature of 10°–35° C. In an alternative and preferred form of the invention the waste water is heated to a temperature of at least 50° C and then 10–35% of the hydrogen peroxide equivalent to the formaldehyde is added.

10 Claims, No Drawings

PROCESS FOR DETOXIFICATION OF FORMALDEHYDE CONTAINING WASTE WATERS

This application is a continuation-in-part of application Ser. No. 569,747 filed Apr. 21, 1975 now abandoned. The entire disclosure of the parent application is hereby incorporated by reference and relied upon.

In the formaldehyde processing industries, predominantly in the use of commercial aqueous formaldehyde solutions for the production of condensation resins (phenol, urea and melamine-formaldehyde resins) there are formed formaldehyde containing waste waters. Their formaldehyde content can be up to 5% (F. Meinck, H. Stoof, H. Kohlschutter, "Industrieabwasser," 3rd edition, 1960, Gustav Fischer Verlag, Stuttgart, pages 483–485).

Because of the toxicity of formaldehyde, the purification of such waste waters is not practical without doing anything further in biological clarification plants, because the normal biological turf dies due to the action of the formaldehyde. In detailed investigations of the biological oxidation of formaldehyde, it was established that formaldehyde containing waste waters are poisonous at the normally occurring concentrations of 135–174 mg/l in normal biochemical processes (I. Gellmann, H. Heukelekian, "Sew. and Wastes," Vol. 22 (1950), pages 1321–1325).

By special selection and adaptation, a biological turf or activated sludge can be formed which is capable of breaking down formaldehyde. Thus, for example, the concentration of 135 up to 1,750 mg/l oxidizable by biochemical processes can be increased. To be sure, the addition of N and P containing nutrient salts is necessary for formation of a sludge formed by airing (F. Sierp "Die gewerblichen und industriellen Abwasser," 3rd edition, 1967, Springer-Verlag Berlin/Heidelberg/New York, pages 418–420). This procedure, therefore, requires the relatively expensive operation of a special plant for biological purification.

Consequently, it is mostly more suitable to remove the formaldehyde either with the help of physical methods, i.e., distillation or by chemical processes before the waste water is led to the biological clarification plant. A distillation of the formaldehyde is only profitable at higher concentrations above 2%.

There has been considered for the chemical treatment to remove formaldehyde, for example, the conversion of formaldehyde to hexamethylene-tetramine by addition of ammonia. However, the addition of ammonia contributes to an undesired eutrophication. Apart therefrom in the presence of acid reacting waste water, hexamethylene-tetramine hydrolyzes again to formaldehyde and ammonia or to corresponding ammonium salts.

A. Assenov, E. Dyankova and L. Yankov in "Wasser, Luft und Betrieb" Vol. 17 (1973) No. 2, pages 46–47 describe a process for "Beseitigung von Formaldehyde aus Abwassern" (Removal of Formaldehyde from Waste Water) in which such waste water is treated with a lime solution to convert the formaldehyde into nontoxic ketoses and aldoses.

This aldol-condensation goes very slowly at room temperature of about 18°–20° C. (about 3–4 days). However, at a temperature of 60° C. the formaldehyde is consumed within 20–30 minutes. To be sure this process is only used at relatively low formaldehyde concentrations of 0.5 weight %. The concentration of calcium hydroxide is 2 g/l.

Besides the yellow or brown coloring of the treated waste water in this process is a disadvantage; the coloring increases with increased formaldehyde concentration. Our own experiments show that, for example, if a 2 weight % formaldehyde solution is treated with milk of lime as concentrated at 2 weight % the solution after the treatment is deep brown while a 6 weight % formaldehyde solution is colored almost black. Also, the strong caramel-like odor is disturbing.

Other processes such as chlorination, ozonization or the catalytic oxidation also have disadvantages. Thus there has been proposed the so-called liquid phase oxidation (Int. Chem. Eng. 12 (1972), 4 pages 649–651 or I. S. Stepanyan, I. A. Vinokur, G. M. Padaryan, Khim. prom. (1972) 6 30/31) by means of air-oxygen whereby the waste water with the help of air is fed through a nozzle into an electrically heated reactor at 40 bar and at 200° C.

This process is very expensive industrially. Besides the degree of oxidation of the formaldehyde is only between 80 and 93%, i.e., there remains a certain residue of non-oxidized formaldehyde.

It has now been found that formaldehyde can be removed quickly and quantitatively from waste water if the waste water is treated with hydrogen peroxide in the presence of alkali at an initial temperature of 10°–35° C.

The reaction of hydrogen peroxide and formaldehyde is known in itself, see Walker, "Formaldehyde," 3rd edition pages 244–247 and is also employed for the determination of formaldehyde (loc. cit.).

However, this reaction does not render obvious the use of the reaction to detoxify formaldehyde containing waste waters. Even if the concentration of formaldehyde generally does not mount above 10 weight % in the waste water, the amount of hydrogen developed as well as the formate in large amounts of waste water is not regarded as unobjectionable.

Therefore, until recently there have been employed processes which were impractical or not completely practical and either led to eutrophication or which must be carried out with large amounts of milk of lime at elevated temperatures, see the above cited references. Even the most recent process of Assenov (loc. cit.) was not usable at higher formaldehyde concentrations.

As is known, the content of materials in waste waters fluctuates widely, so that a process which responds to both small and high formaldehyde contents would have great industrial significance. This requirement, however, is answered by the process of the invention which not only proceeds completely satisfactorily at high formaldehyde contents but also at very low formaldehyde concentrations of 0.02 – 0.5 weight %.

The process of the invention is usable at concentrations of formaldehyde of from 0.01 – 10 weight % in the waste water. The higher the temperature of treatment, the shorter is the reaction time. The time generally is between 3 and 30 minutes.

The process is carried out with commercial hydrogen peroxide, i.e. with solutions of 25–70 weight %, preferably 30–50 weight %. The mixing of the hydrogen peroxide into the waste water is preferably carried out with stirring in open containers. Hydrogen peroxide is normally added in an amount equivalent to the formaldehyde present. Excess can be used but is usually held as low as possible on economical grounds.

Likewise, the alkali is used in equivalent amount based on the formaldehyde. In a given case, an excess up to about 5 mol % can be used. As alkalis there can be used alkali hydroxides, preferably sodium hydroxide. However, there can be used other alkalis such as potassium hydroxide. The preferred minimum pH-value is 10, smaller pH-values are also possible. The hydroxide or other alkali can be added in solid form or in aqueous solution of any concentration.

The amounts of hydrogen peroxide and alkali added naturally depend on the amounts of formaldehyde present, which can be ascertained by a small scale experiment on the waste water involved.

It is most favorable to add the alkali to the waste water and then to mix in the hydrogen peroxide, since then the reaction starts immediately and proceeds with heating.

After the treatment, the waste water is tested qualitatively or quantitatively for any remaining formaldehyde, namely colorimetrically by the very sensitive condensation reaction between formaldehyde, acetylacetone and ammonia to form the yellow colored diacetyldihydrolutidine (T. Nash, Nature (London) 170 (1952), 976). Traces of hydrogen peroxide still present are determined iodometrically.

The still alkaline reacting waste water resulting from the process of the invention is neutralized by adding small amounts of dilute sulfuric acid or another mineral acid, e.g., hydrochloric acid and can then be led to the biological clarification.

Unless otherwise indicated, all parts and percentages are by weight.

The following examples further illustrate the process of the invention.

EXAMPLE 1

Waste water samples with formaldehyde contents between 0.02 and 7 weight % were treated at room temperature with 2 N sodium hydroxide in which an excess of 2.5% of the stoichiometrically required amount was used. Under stirring there was added in each case corresponding to the formaldehyde concentration the stoichiometrical amount of 30 weight % aqueous hydrogen peroxide solution.

Immediately after the addition of the hydrogen peroxide the reaction started. The reaction was recognized by the increase in temperature observable at formaldehyde concentrations of 0.5% and higher.

The reaction mixture was stirred for 30 minutes, subsequently the residual formaldehyde content was determined colorimetrically.

The results obtained are collected in Table 1.

Table 1

Formaldehyde Containing Waste Water Treated With Alkali And Hydrogen Peroxide at Room Temperature

| Waste Water HCHO Content % | Per Liter of Waste Water 2N Sodium Hydroxide (2.5% excess) ml | Addition of Hydrogen Peroxide 30 Weight %, ml | Temperature ° C | HCHO Residue % |
|---|---|---|---|---|
| 7 | 1196 | 119 | 21–70 | 0 |
| 6 | 1025 | 102 | 21–70 | 0 |
| 5 | 854 | 85 | 21–60 | 0 |
| 4 | 684 | 68 | 25–60 | 0 |
| 2 | 342 | 34 | 22–45 | 0 |
| 1 | 171 | 17 | 22–36 | 0 |
| 0.5 | 85.4 | 8.5 | 22–29 | 0.01 |
| 0.1 | 17.0 | 1.7 | 21 | 0.01 |
| 0.05 | 8.5 | 0.85 | 22 | 0.01 |

Table 1-continued

Formaldehyde Containing Waste Water Treated With Alkali And Hydrogen Peroxide at Room Temperature

| Waste Water HCHO Content % | Per Liter of Waste Water 2N Sodium Hydroxide (2.5% excess) ml | Addition of Hydrogen Peroxide 30 Weight %, ml | Temperature ° C | HCHO Residue % |
|---|---|---|---|---|
| 0.02 | 3.4 | 0.34 | 22 | 0.01 |

When two temperatures are set forth in the temperature column in Table 1 the first figure is the temperature at which the sodium hydroxide and hydrogen peroxide were added and the second figure is the maximum temperature reached as a result of the exothermic reaction.

From Table 1 it can be seen that the formaldehyde present can be completely eliminated or be present in only the insignificant amount of 0.01 weight %. The iodometric determination of the residual hydrogen peroxide shows that this is present only in trace amounts (<0.01%)

EXAMPLE 2

One cubic meter of waste water having a formaldehyde content of 1.7% at a temperature of 17° C. in a large container equipped with a stirrer was mixed with 210 liters of 10% sodium hydroxide. Under further stirring there were then added 24.5 liters of 35 weight % hydrogen peroxide solution. Immediately after the addition of the hydrogen peroxide solution the reaction began and was recognized by increase of the temperature to 40° C. and gas development. After a time of 30 minutes the waste water was free from formaldehyde. The still alkaline reacting water was neutralized with dilute sulfuric acid.

EXAMPLE 3

There were dissolved 23.3 kg of sodium hydroxide in 1 cubic meter of waste water having a formaldehyde content of 1.7 weight % in a large container equipped with a stirrer. To the warm water at about 35° C. there were added 24.5 liters of 35 weight % hydrogen peroxide solution with further stirring. The reaction commenced immediately after the addition of the hydrogen peroxide solution, recognized by gas development and increase of the temperature up to 65° C. Already after 5 minutes action of the hydrogen peroxide solution the water was completely free from formaldehyde. Subsequently, the still alkaline reacting waste water was neutralized with dilute sulfuric acid.

EXAMPLE 4

Waste water samples with formaldehyde contents between 0.02 and 1 weight % were treated with 2N sodium hydroxide both at room temperature and at an elevated temperature of about 35° C. An excess of 2.5% of the stoichiometrically required amount of sodium hydroxide was employed. With stirring, the samples were then treated with the stoichiometric amount of 30 weight % hydrogen peroxide corresponding to the formaldehyde concentration. The reaction began immediately after the addition of the hydrogen peroxide solution and was recognized by the development of gas.

The reaction mixture was stirred for about 30 minutes, after that samples were drawn in which the residual contents of formaldehyde and hydrogen peroxide were determined.

The results are collected in following Table 2. In Part A the starting temperature was room temperature, in Part B there was employed the higher starting temperature of about 35° C.

Table 2

| Waste Water HCHO Content % | Added Per Liter of Waste Water | | Temperature ° C | 10 Min. Residue of | | 20 Min. Residue of | | 30 Min. Residue of | |
|---|---|---|---|---|---|---|---|---|---|
| | 2N NaOH ml | $H_2O_2$ Solution 50 wt. % ml | | HCHO % | $H_2O_2$ % | HCHO % | $H_2O_2$ % | HCHO % | $H_2O_2$ % |
| 7 | 1196 | 66.3 | 23–73 | 0 | 0 | 0 | 0 | 0 | 0 |
| 5 | 854 | 47.4 | 24–65 | 0 | 0 | 0 | 0 | 0 | 0 |
| 4 | 684 | 37.9 | 25–60 | 0 | 0.003 | 0 | 0.001 | 0 | 0.002 |
| 2 | 342 | 19.0 | 22–43 | <0.01 | 0.001 | <0.01 | 0.001 | 0 | 0.001 |
| 1 | 171 | 9.5 | 22–33 | 0.04 | 0.017 | 0.01 | 0.002 | 0 | 0.001 |
| 0.5 | 85.4 | 4.7 | 22–28 | 0.07 | 0.042 | 0.03 | 0.021 | 0.01 | 0.015 |
| 0.1 | 17.0 | 0.95 | 22 | 0.04 | 0.031 | 0.02 | 0.020 | 0.01 | 0.012 |
| .05 | 8.5 | 0.48 | 22 | 0.04 | 0.024 | 0.03 | 0.018 | 0.01 | 0.002 |
| .02 | 3.4 | 0.18 | 22 | 0.02 | 0.017 | 0.01 | 0.013 | 0.01 | 0.003 |

Formaldehyde Containing Waste Water Treated With Alkali and Hydrogen Peroxide

| Waste Water Content % | Added per Liter of Waste Water | | Temp. ° C | HCHO Residue % | $H_2O_2$ Residue % |
|---|---|---|---|---|---|
| | 2N NaOH ml | $H_2O_2$ 30 wt. % ml | | | |
| A (Room Temperature) | | | | | |
| 0.02 | 3.4 | 0.34 | 21 | <0.01 | <0.01 |
| 0.05 | 8.5 | 0.85 | 21 | 0.01 | <0.01 |
| 0.10 | 17.0 | 1.7 | 21 | 0.01 | <0.01 |
| 0.5 | 85.4 | 8.5 | 21–26 | 0.01 | <0.01 |
| B (about 35° C.) | | | | | |
| 0.02 | 3.4 | 0.34 | 35 | <0.01 | <0.01 |
| 0.05 | 8.5 | 0.85 | 35 | <0.01 | <0.01 |
| 0.10 | 17.0 | 1.7 | 35–37 | 0.01 | <0.01 |
| 0.5 | 85.4 | 8.5 | 35–40 | <0.01 | <0.01 |

When two temperatures are set forth in the temperature column in Table 2 the first figure is the temperature at which the sodium hydroxide and hydrogen peroxide were added and the second figure is the maximum temperature reached in the exothermic reaction.

At both room temperature and 35° C., practically the same effect was produced within the maximum time of 30 minutes. The formaldehyde content can be eliminated in the process to a negligible residue of 0.01%. Only traces of the hydrogen peroxide added were detectable after the reaction. This means that the use of higher temperatures is not essential for the removal of formaldehyde within one-half hour.

EXAMPLE 5

In a further series of tests waste water samples having formaldehyde contents between 0.02 and 7 weight % were treated with 2N sodium hydroxide at room temperature according to the process described in the preceding examples and finally treated with 50 weight % hydrogen peroxide solution. After reaction times of 10, 20 and 30 minutes, samples were drawn, in which the formaldehyde and hydrogen peroxide present were determined analytically.

Table 3 sets forth the results. In Table 3, when two temperatures are set forth in the temperature column, the first figure is the temperature at which the sodium hydroxide and hydrogen peroxide were added and the second figure is the maximum temperature reached in the exothermic reaction.

From Table 3 it can be seen that even after just 10 minutes of reaction time, waste water with formaldehyde contents of over 0.5 or 1 weight % are practically formaldehyde free.

Table 3

At formaldehyde contents below 1 or 0.5 weight % for the purpose of further elimination of formaldehyde, it is desirable to maintain the reaction for at least 20 minutes, or even 30 minutes.

The process can comprise, consist essentially of, the steps and conditions set forth.

In examples 1 to 5 samples of the used waste waters with formaldehyde contents up to 5% were taken from the production processes of phenolic, melamine and urea resins. Samples with higher formaldehyde contents above 5% were prepared by diluting technical formaldehyde solutions with water.

It has now further been found that the procedure described above and disclosed and claimed in our parent application can be still further improved by subjecting the formaldehyde containing waste water to a preliminary treatment at a temperature of at least 50° C. Thus the temperature of the alkaline treatment can be 50° to 100° C or 60° to 85° C.

In the process of the parent case using an initial temperature of 10°–35° C. for the hydrogen peroxide treatment it is necessary to add hydrogen peroxide in an amount equivalent to that corresponding to the reaction formula for reaction with formaldehyde, or to use a slight excess of the hydrogen peroxide thereover, to remove all of the formaldehyde.

On the contrary it has now been found that the amount of hydrogen peroxide can be very strongly reduced if the formaldehyde containing waste water is first treated with an alkaline acting material at a temperature of at least 50° C. and then is treated with about 10–35% by weight of the amount of hydrogen peroxide equivalent to that called for by the reaction formula of hydrogen peroxide and formaldehyde (see Walker, loc. cit.).

The height of the temperature to which the waste water is preheated depends on the concentration of formaldehyde in the waste water. At concentrations of 2 weight % of formaldehyde or more in the waste water an initial temperature of 50° C. is sufficient. At higher initial temperatures, such as 60° or 65° C. the reaction is considerably quicker and because of the exothermic heat of reaction (aldol condensation) the temperature increases still further. The reaction is complete in about 30 minutes.

At concentrations of formaldehyde below 1 weight % of formaldehyde on the contrary it is preferable to preheat to still higher temperatures, i.e., to about 80° C., since at the smaller formaldehyde concentration the reaction heat developed is not sufficient to elevate the temperature of the composition.

As alkaline acting materials there can be used, for example, alkali or alkaline earth hydroxides such as potassium hydroxide, sodium hydroxide, barium hydroxide and calcium hydroxide. Sodium hydroxide or calcium hydroxide (milk of lime) are preferred.

While the alkali hydroxide can be added in an amount equivalent to the formaldehyde content present (as pointed out above), in a given case with an excess of alkali hydroxide up to about 3 mole %, with the waste waters containing the more interesting formaldehyde contents of 0.02 to 7 weight % there are only needed smaller amounts of alkaline earth hydroxide, which, for example, for these contents amount to 20 grams of calcium hydroxide per liter of waste water when employing milk of lime or when using barium hydroxide about 40–60 grams per liter of waste water.

As indicated above the alkaline acting material can be added either in solid form or in any commercially available aqueous solution.

The reaction time of the alkaline material usually is about 30–40 minutes. Then the hydrogen peroxide is added, preferably with stirring, in an amount of 10–35 weight % of the amount equivalent to the formaldehyde. External heating need not be carried out during this addition. After a reaction time of about 10 minutes the waste water is completely free of formaldehyde and besides is colorless and odor free. The analytical method used for determination of residual formaldehyde and unreacted hydrogen peroxide are those set forth above.

The hydrogen peroxide concentrations employed are the same as those set forth above and the apparatus is likewise the same.

When using alkaline earth bases, especially calcium hydroxide, the waste waters before the neutralization (with small amounts of mineral acids, e.g., hydrochloric acid, and especially sulfuric acid) are separated from the precipitated alkaline earth metal salts by filtration. The neutralized waste water is then led to the biological clarification.

It was very surprising that the detoxification process of the invention could be carried out with substantially less than the equivalent amount of hydrogen peroxide theoretically required to detoxify the formaldehyde present, since according to J. F. Walker, Formaldehyde, 3rd Edition, Reinhold Publ. Corp., New York 1964, pages 244, et seq., and 488–489, it was always considered necessary to use the equivalent amount of hydrogen peroxide. The amount of hydrogen formed in the reaction was also drastically reduced, which is of interest, especially for very large amounts of waste waters.

EXAMPLE 6

Waste water samples having a formaldehyde content between 0.02 and 7 weight % were heated to 60°–65° C. and mixed with 30% of milk of lime, with stirring. The amount of 30% milk of lime amounted to 67 grams, which corresponds to 20 grams of $Ca(OH)_2$ based on a liter of waste water.

The mixture was treated at the stated temperature for about 30 minutes. The aldol condensation was clearly recognizable by the coloration of the samples from brown to black according to the formaldehyde concentration, the caramel-like odor, as well as with the samples having a formaldehyde content of 1% or higher by the exothermic course of the reaction (temperature increase up to 85° C.). With the samples having a formaldehyde content below 1% the reaction was hastened by heating to a maximum of 80° C.

After about 30 minutes there was added to the samples 30 weight % $H_2O_2$ solution, whose amount was up to one-third the stoichiometrically required amount to reduce the formaldehyde. The reaction mixture was treated with stirring for another 10 minutes without further heating. Then the lime was filtered off and the clear, still alkaline reacting waste water neutralized by the addition of small amounts of dilute sulfuric acid. The samples were decolorized within a few minutes by the addition of the $H_2O_2$ and they were odorless. The residual formaldehyde content was determined colorometrically, the residual $H_2O_2$ iodometrically.

The results obtained are set forth in Table 4.

Table 4

| Waste Water HCHO Content % | Per Liter of Waste Water Addition of | | Temp. Increase Up to ° C. | Residual HCHO After 40 Minutes %[3] |
|---|---|---|---|---|
| | Milk of Lime g.[1] | $H_2O_2$ 30 Weight % ml. | | |
| 7 | 67 | 40 | 85 | 0.005 |
| 6 | 67 | 34 | 85 | 0.005 |
| 5 | 67 | 29 | 85 | 0.005 |
| 4 | 67 | 23 | 80 | 0.004 |
| 2 | 67 | 12 | 75 | 0 |
| 1 | 67 | 6 | 68 | 0 |
| 0.5 | 67 | 3 | 75[2] | 0 |
| 0.1 | 67 | 0.6 | 78[2] | 0 |
| 0.05 | 67 | 0.3 | 80[2] | 0 |
| 0.02 | 67 | 0.1 | 80[2] | 0 |

[1]Corresponds to about 20 grams of $Ca(OH)_2$
[2]by subsequent heating
[3]total time of the reaction of the milk of lime and $H_2O_2$.

From the above it can be seen that the formaldehyde can be completely eliminated or reduced to an insignificant maximum of 0.005%. The residual amount of $H_2O_2$ found was between 0.001 and 0.01%.

EXAMPLE 7

Waste water samples with formaldehyde contents of 0.02–7 weight % were heated to 60°–65° C. and mixed with 2N NaOH using an excess of sodium hydroxide of 2.5% of that stoichiometrically required. The mixtures were treated for about 30 minutes at the stated temperature with stirring.

With the samples containing 2% of formaldehyde or higher the action of the alkali was observed by the brown coloration which developed within the given time. The samples with lower formaldehyde contents, i.e., <2% remained clear.

After about 30 minutes there were added to the samples 30 weight % $H_2O_2$ solution whose amount was only one third that required stoichiometrically to reduce the formaldehyde. The samples were treated with stirring for a further 10 minutes without additional heating. Inside this time decoloration of the darkly colored samples took place. The samples were neutralized with dilute sulfuric acid.

The results are set forth in Table 5.

Table 5

| Waste Water HCHO Content % | Per Liter of Waste Water Addition of | | Residual HCHO After 40 Minutes, %[2] |
|---|---|---|---|
| | In NaOH[1] ml. | $H_2O_2$ 30 Weight % ml. | |
| 7 | 1196 | 40 | 0 |
| 5 | 854 | 29 | 0 |

Table 5-continued

| Waste Water HCHO Content % | Per Liter of Waste Water Addition of | | Residual HCHO After 40 Minutes, %[2] |
|---|---|---|---|
| | 2N NaOH[1] ml. | $H_2O_2$ 30 Weight % ml. | |
| 4 | 684 | 23 | 0 |
| 2 | 342 | 12 | 0 |
| 1 | 171 | 6 | 0.08 |
| 0.5 | 85.4 | 3 | 0.06 |
| 0.1 | 17.0 | 0.6 | 0.05 |
| 0.05 | 8.5 | 0.3 | 0.03 |
| 0.02 | 3.4 | 0.1 | 0.01 |

[1] 2.5% excess over the stoichiometrically required amount
[2] total time of the action of NaOH and $H_2O_2$ The subsequent colorometric determination of the formaldehyde showed that the samples with formaldehyde contents of 2% and higher were completely formaldehyde free. The samples with lower starting concentrations, i.e., below 2%, only had residual formaldehyde contents with a maximum of 0.08%. $H_2O_2$ was not found in any of the samples.

EXAMPLE 8

Formaldehyde containing waste water samples with lower formaldehyde contents of 0.02 to 1 weight % were heated to 80°–85° C. and mixed with 2N NaOH, using an excess of 2.5% over the stoichiometrically required amount.

One set of experiments was carried out for 30 minutes, and another set of experiments for 40 minutes, at this temperature. Within these times, a slight coloration of yellow to yellow brown occurred.

Then the samples were mixed with aqueous hydrogen peroxide solutions, in one series using 30 weight % $H_2O_2$ and in another series 50 weight % $H_2O_2$. The amounts of $H_2O_2$ in each case were one-third the amount stoichiometrically required to reduce the formaldehyde. Inside a few minutes the samples were decolorized without further heating.

The experimental results after 10 minutes of $H_2O_2$ treatment are set forth in Table 6

Table 6

| Waste Water HCHO Content % | Per Liter of Waste Water Addition of | | | Addition of $H_2O_2$ after minutes | Residual HCHO % After |
|---|---|---|---|---|---|
| | 2N NaOH[1] ml. | $H_2O_2$ 30 Wt. % ml. | 50 Wt. % ml. | | |
| 1 | 171 | 6 | 3.4 | 30 | 0 |
| 0.5 | 85.4 | 3 | 1.6 | 30 | 0 |
| | | | | | 40 min.[2] |
| 0.1 | 17.0 | 0.6 | 0.4 | 30 | 0.05 |
| 0.05 | 8.5 | 0.3 | 0.2 | 30 | 0.03 |
| 0.02 | 3.4 | 0.1 | 0.06 | 30 | 0.01 |
| 1 | 171 | 6 | 3.4 | 40 | 0 |
| 0.5 | 85.4 | 3 | 1.6 | 40 | 0 |
| | | | | | 50 min.[2] |
| 0.1 | 17.0 | 0.6 | 0.4 | 40 | 0.002 |
| 0.05 | 8.5 | 0.3 | 0.2 | 40 | 0.002 |
| 0.02 | 3.4 | 0.1 | 0.06 | 40 | 0.005 |

[1] 2.5 excess over the stoichiometrically required amount
[2] total time of the action of NaOH and $H_2O_2$.

From Table 6 it can be seen that after a total of 40 minutes only a maximum of 0.05% of formaldehyde was detectable, so that after this time a satisfactory elimination of formaldehyde could be produced. After a total of 50 minutes the samples were practically free from formaldehyde except for insignificant traces. $H_2O_2$ was no longer detectable.

EXAMPLE 9 (Comparison Example)

One cubic meter of waste water containing 2 weight % of formaldehyde was treated with the equivalent amount of 2N sodium hydroxide, as well as a 2.5% excess, at room temperature and immediately subsequent mixed with 34 liters of aqueous 30 weight % hydrogen peroxide.

In place of 34 liters of 30 weight % hydrogen peroxide there can also be used 19 liters of 50 weight % hydrogen peroxide.

In contrast if the same amounts and the same type of waste water with the above-mentioned amounts of 2N sodium hydroxide were heated at 60°–65° C. for 30 minutes with stirring, there were still required 12 liters of 30 weight % or 7 liters of 50 weight % hydrogen peroxide to obtain an odorless and colorless free waste water which was free of formaldehyde.

The process of the invention can comprise, consist essentially of or consist of the steps and conditions set forth above.

The sources of the samples in examples 6 to 9 were the same as those in examples 1 to 5.

What is claimed is:

1. A process for detoxifying formaldehyde containing waste water comprising treating the waste water with an alkaline material at a temperature of at least 50° C. and then adding hydrogen peroxide in an amount equivalent to 10–35% of the formaldehyde in the waste water.

2. The process of claim 1 wherein the temperature of the alkaline treatment is 50° to 100° C.

3. The process of claim 2 wherein the temperature of the alkaline treatment is 60°–85° C.

4. The process of claim 1 wherein the waste water contains 0.01 to 10% formaldehyde.

5. The process of claim 4 wherein the waste water contains 0.02 to 7% formaldehyde.

6. The process of claim 5 wherein the waste water is from a plant making formaldehyde containing resins.

7. The process of claim 5 wherein the alkaline material is an alkali metal hydroxide or an alkaline earth metal hydroxide.

8. The process of claim 7 wherein the alkaline material is sodium hydroxide.

9. The process of claim 7 wherein the alkaline material is calcium hydroxide.

10. The process of claim 7 wherein the alkaline material is sodium hydroxide or calcium hydroxide and the temperature is 50° to 100° C.

* * * * *